March 26, 1929. L. S. LACHMAN ET AL 1,706,892
GRATING
Filed May 8, 1926
Fig. 1,
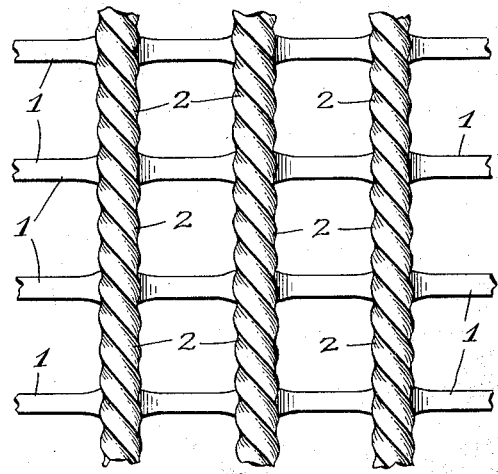
Fig. 2,
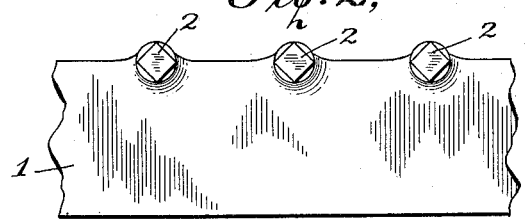
Fig. 3.
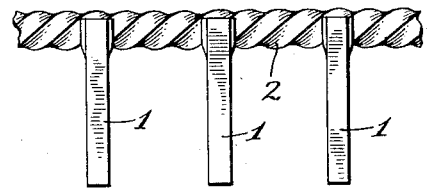
INVENTORS
Laurence S. Lachman
John R. Tench
BY
Townsend & Decker
THEIR ATTORNEYS

Patented Mar. 26, 1929.

1,706,892

UNITED STATES PATENT OFFICE.

LAURENCE S. LACHMAN, OF FOREST HILLS, AND JOHN R. TENCH, OF WHITE PLAINS, NEW YORK, ASSIGNORS TO BETHLEHEM STEEL COMPANY, A CORPORATION OF PENNSYLVANIA.

GRATING.

Application filed May 8, 1926. Serial No. 107,564.

This invention relates to metallic structures adapted particularly for use as floor or sidewalk gratings.

The principal object of the invention is the production of a structure of the character described which shall be of strong and rigid construction and which may be easily manufactured.

Briefly stated the invention consists in welding to the edges of a plurality of spaced flat bars a plurality of transverse bars, preferably twisted or otherwise deformed, at spaced intervals to form a unitary structure, the transverse bars providing a surface forming a non-slip tread when the structure is used as a grating.

A practical embodiment of the invention is illustrated in the accompanying drawing in which:

Fig. 1 is a plan view of the structure of the invention.

Fig. 2 is a front elevation thereof.

Fig. 3 is a side elevation thereof.

Referring in detail to the drawing:

1 indicates a plurality of supporting metal bars which may be of any standard size and which are arranged in parallelism as shown and at spaced intervals. A plurality of twisted or otherwise deformed transverse surface bars are indicated at 2.

Said transverse bars 2 are connected to the upper edges of bars 1 at spaced intervals preferably by welding them thereto by electric resistance welding and in such manner that the edges formed by the twists or deformations of the bars 2 will preferably lie in a plane slightly above the surfaces of the upper edges of the bars 1 and will provide a non-slip tread when the structure is used as a grating. The openings formed by the intersecting members provide ventilating openings for the grating.

The structure described is exceedingly rigid and inexpensive as both the supporting bars and twisted bars are standard and no special tools, dies or machinery are necessary in manufacture. Also by using twisted bars a more thorough and rapid welding of the two sets of bars is secured than would be secured if round or straight transverse bars were used as the twisted bars provide a plurality of points of contact with the edges of the bars 1 and a better heating condition is thus secured.

What we claim as our invention is:

1. A metallic structure comprising a multiplicity of spaced bars and a multiplicity of deformed transverse bars connected thereto, said transverse bars being formed with roughened surfaces which function in securing the transverse bars to the first mentioned spaced bars and to furnish a tread surface.

2. A metallic structure comprising a plurality of spaced bars and a plurality of transverse twisted bars welded to the edges of said first-named bars.

3. A metallic structure comprising a plurality of separated supporting bars and a plurality of separated transverse twisted bars welded to the edges of said supporting bars with portions of said twisted bars lying in a plane above the surfaces of the edges of said supporting bars.

4. A rigid, metallic grating, comprising a plurality of spaced bars and a plurality of twisted, rigid bars arranged transversely to the first mentioned bars and electrically welded thereto, said twisted bars constituting a non-slip tread.

5. A rigid, metallic grating, comprising a multiplicity of spaced bars and a multiplicity of spaced bars, twisted through the greater part of their length, arranged transversely of the first mentioned bars and secured thereto to constitute a tread surface, a number of the bars being rigid to give rigidity to the grating.

6. A rigid, metallic grating, comprising a plurality of spaced bars and a plurality of spaced bars, twisted through a substantial part of their length, arranged transversely of the first mentioned bars and integral therewith, a number of the bars being rigid to give rigidity to the grating.

7. A rigid, metallic grating, comprising a plurality of spaced bars and a plurality of spaced bars arranged transversely of the first mentioned bars and secured thereto, said second mentioned bars substantially throughout their length having ridges extending in a direction at a substantial angle to the direction of length of such bars, but at an angle substantially less than 90° to constitute a tread surface.

8. A rigid, metallic grating, comprising a plurality of spaced bars and a plurality of spaced bars arranged transversely of the first mentioned bars and secured thereto, said second mentioned bars having ridges extending in a direction at a substantial angle to the direction of length of such bars, but at an angle substantially less than 90°, portions of the ridges being above the plane of the first mentioned bars.

9. A rigid, metallic grating, comprising a first set of spaced bars, a second set of spaced bars disposed transversely of the first set of bars, at least a number of bars having ridges inclined to the direction of length thereof, said first set of bars being electrically welded to said second set in such a manner that the inclined ridges act as welding ridges.

10. A metallic structure adapted to furnish a tread surface comprising a plurality of rigid, spaced supporting bars, and a plurality of deformed, spaced, transverse bars pressure welded for the greater portion of their thickness into the substance of the supporting bars.

Signed at New York in the county of New York and State of New York this 7th day of May, A. D. 1926.

LAURENCE S. LACHMAN.
JOHN R. TENCH.